United States Patent
Takahashi

Patent Number: 6,125,443
Date of Patent: Sep. 26, 2000

[54] INTERRUPT PROCESSING SYSTEM AND METHOD FOR INFORMATION PROCESSING SYSTEM OF PIPELINE CONTROL TYPE

[75] Inventor: Chiaki Takahashi, Hadano, Japan

[73] Assignees: Hitachi, Ltd., Tokyo; Hitachi Information Technology Co., Ltd., Kanagawa-ken, both of Japan

[21] Appl. No.: 09/154,715

[22] Filed: Sep. 17, 1998

[30] Foreign Application Priority Data

Sep. 19, 1997 [JP] Japan ................................. 9-255012

[51] Int. Cl.$^7$ ........................................................ G06F 9/00
[52] U.S. Cl. ............................ 712/244; 710/260; 710/261; 710/269; 712/233
[58] Field of Search ................................ 712/244, 233, 712/235; 710/260, 261, 262, 263, 264, 265, 269

[56] References Cited

U.S. PATENT DOCUMENTS

| | | | |
|---|---|---|---|
| 5,341,482 | 8/1994 | Cutler et al. | 712/244 |
| 5,649,136 | 7/1997 | Shen et al. | 712/244 |
| 5,822,578 | 10/1998 | Frank et al. | 712/244 |

Primary Examiner—John A. Follansbee
Assistant Examiner—Mackly Monestime
Attorney, Agent, or Firm—Antonelli, Terry, Stout & Kraus, LLP

[57] ABSTRACT

An interrupt processing system and method for an information processing system of pipeline control type are disclosed. The occurrence of an exception is detected for each plurality of instructions to be processed in parallel. The occurrences of exceptions, when detected for a plurality of the instructions to be processed in parallel, are reported collectively according to each cause of the exceptions. In the case where the occurrences of exceptions are reported for a plurality of the instructions to be processed in parallel by an exception reporting unit, an interrupt request is issued. In response to the interrupt request, the pipeline processing is restored by an instruction control unit to the state before execution of the leading one of the plurality of the instructions to be processed in parallel for which the occurrences of exceptions are detected, and the instructions are reexecuted one by one sequentially from the leading one of the plurality of instructions through the instruction control unit. Thus, an interrupt is accurately processed upon occurrence of an exception.

10 Claims, 7 Drawing Sheets

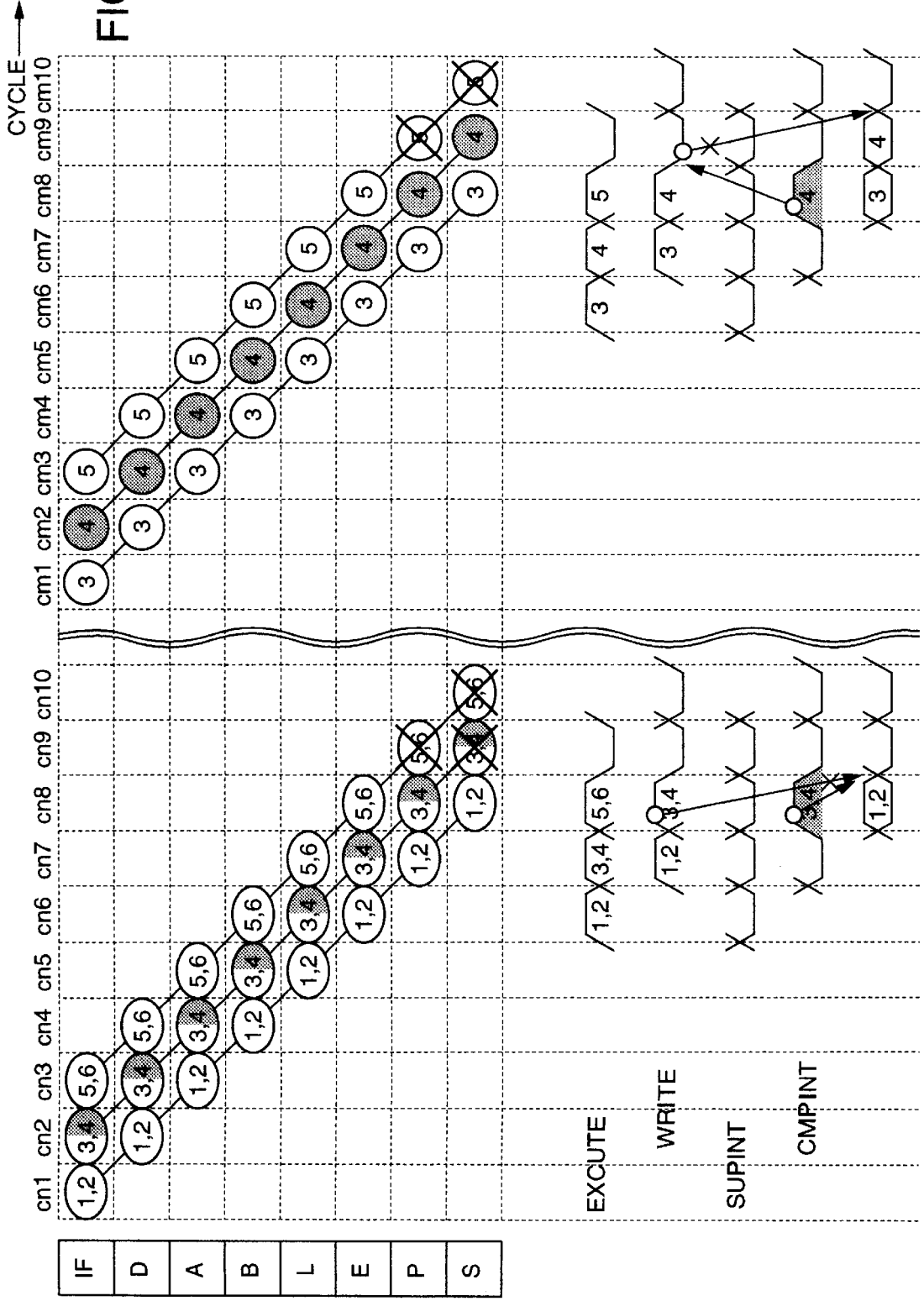

INTERRUPT PROCESSING SYSTEM AND METHOD FOR INFORMATION PROCESSING SYSTEM OF PIPELINE CONTROL TYPE

BACKGROUND OF THE INVENTION

The present invention relates to an information processing system for processing instructions using a pipeline processing scheme, or more in particular to a technique of assuring an accurate interruption in the case where a plurality of instructions are processed in pipeline.

The pipeline processing is a system in which the processing of instructions is divided into a plurality of processing stages having the same execution time (cycle), and a plurality of instructions are executed in overlapped fashion in each cycle pitch thereby to improve the processing speed. In realizing a pipeline processing system, a well-balanced design between the number of processing stages (number of pipeline stages) and the processing time per stage (machine cycle) is crucial for improving the processing speed of the information processing system.

Another important point for designing an information processing system of pipeline processing type is a processing scheme employed in the case where the pipeline is disturbed by such events as a failure in branching prediction or an interruption due to the occurrence of an exception.

The branching prediction is a scheme in which the instruction is executed in anticipation from a dynamically predicted jump address of a branching instruction to reduce the overhead of the branch instruction processing. The processing is continued when the prediction is successful. In the case where the prediction fails, however, the processing of the instruction stream for which the prediction has failed is required to be canceled and the instruction processing is required to be restarted immediately with a correct instruction stream. The dynamic frequency of occurrence of the branch instruction is generally as high as once per 3 to 5 instructions. An improved branch prediction accuracy and a reduced overhead time at the time of prediction failure are crucial for realizing a branch prediction system.

On the other hand, an interruption caused by various exceptions occurring during the execution of an instruction is generally not so frequent and requires analysis of the causes and countermeasures by software (interrupt handler, etc.) as well as interruption in hardware. A temporally critical processing, therefore, is not required as in the case of branching prediction failure. What is required in interruption is to meet the interrupt specification defined in architecture which is required to be observed by the information processing system.

In the case where an invalid instruction code interrupt occurs during the execution of a program, for example, the hardware does not process the instruction (suppression of the instruction) but notifies the program of the address of the occurrence of the interrupt and the probable cause thereof (invalid instruction code exception in this case) through an interrupt handler. Also in the case of a page fault interrupt, the hardware does not process the instruction (cancellation of the instruction) but the memory control software eliminates the cause of the page fault and restarts the processing from the time of occurrence of the interrupt, thus continuing to execute the program. In the case where an exception of fixed point overflow occurs, on the other hand, the instruction is processed (completion of the instruction) and the program is notified through the interrupt handler.

In the case of suppression or cancellation, the exception can be detected as soon as the instruction begins to be executed. In the case of completion, however, the exception cannot be detected before the instruction is executed. In an interrupt due to the occurrence of an exception, it is necessary to report the interrupt instruction address and the type of interrupt to the interrupt handler, etc. correctly and to assure the advisability of processing the interrupt instruction in accordance with the type of the interrupt.

FIGS. 1 to 3 show an example of the pipeline process for a conventional information processing system.

In FIGS. 1 to 3, reference characters IF designates an instruction read stage, D a decode stage, A an operand address calculation stage, B an operand read stage, L an operand transfer stage, E an execution stage, P an execution result transfer stage, and S an execution result storage stage for pipeline processing. In the time chart, EXCUTE designates an execution permit signal for permitting the execution of an instruction, WRITE a result storage permit signal for permitting the execution result to be stored in an operand buffer, SUPINT an exception detection signal generated upon detection of an exception of cancellation or suppression type, and CMPINT an exception detection signal generated upon detection of an exception of completion type.

FIG. 1 is a time chart showing the case of processing instructions continuously free of any cause disturbing the pipeline, or the case of what is called a normal execution, FIG. 2 the case in which an interrupt of suppression or cancellation type is generated in the instruction w, for example, and FIG. 3 the case in which an interrupt of completion type is generated in the instruction ②, for example.

Specifically, in the example of FIG. 2, an exception of cancellation or suppression type is detected in the instruction ② and the exception detection signal SUPINT is generated in cycle C7, with the result that the generation of the result storage permit signal WRITE in the instruction ② is suppressed in the next cycle C8. Consequently, the execution result of the instruction ② is not stored in the operand buffer.

In the example of FIG. 3, an exception of completion type is detected in the instruction ② and the exception detection signal CMPINT is generated in cycle C8, so that the generation of the result storage permit signal WRITE in the instruction ③ is suppressed in the next cycle C9. As a result, the execution result of the instruction ③ is not stored in the operand buffer.

As described above, according to the one-instruction processing mode for processing the instructions in pipeline one by one in the prior art, when an exception occurs, the signal for permitting the storage of the result of a particular instruction or a succeeding instruction is suppressed in accordance with the cause of the exception. In this way, an accurate interrupt required by the architecture is realized without executing an overrun instruction.

In the case where the timing from the detection of an exception to the writing of the result is critical, the process mentioned below is carried out, for example. Specifically, in the case where the storage of the result of an instruction execution overrun in a register is permitted, for example, the value on the register before updating the contents thereof is saved in a history buffer or the like. In the hardware interrupt processing, the value on the register invalidly updated by the overrun instruction is restored by writing back with the value saved in the history buffer, thus realizing a function equivalent to suppression. Also, a method is known in which a storage buffer is provided for the storage processing and the result storage stage is delayed to the timing capable of suppression by an exception.

The above-mentioned conventional techniques are described, for example, in "Superscalar Microprocessor Design", by Mike Johnson, Aug. 15, 1994, pp. 86–93, published by Nikkei BP Publication Center.

A method of further increasing the processing speed of the information processing system is by a superscalar processing system for pipeline processing of a plurality of instructions concurrently. For a precise interrupt to be realized in the conventional methods, a plurality of circuits are required for detecting, reporting and holding the interrupt information on an exception for a plurality of individual instructions processed concurrently or in parallel. Further, a complicate circuit is required to discriminate the instruction for completing the process and the instruction for suppression in accordance with which of the concurrently-processed instructions has generated an exception.

SUMMARY OF THE INVENTION

An object of the present invention is to provide an information processing system of pipeline control type capable of processing a plurality of instructions concurrently or in parallel thereby to obviate the problems of the prior art.

Another object of the present invention is to provide an information processing system of pipeline control type capable of processing a plurality of instructions concurrently or in parallel, which like the conventional information processing system executing the pipeline processing of one instruction at a time, realizes an accurate interrupt while as well as avoiding the complication of the execution control circuit.

According to one aspect of the invention, there is provided an interrupt processing system for an information processing system of pipeline control type capable of processing a plurality of instructions sequentially and concurrently through an instruction control unit, comprising an exception occurrence detection unit for detecting the occurrence of an exception for each plurality of instructions to be processed in parallel, an exception reporting unit for reporting, according to each cause, an exception detected in the plurality of instructions to be processed in parallel, an interrupt request control unit for issuing an interrupt request in the case where an exception occurrence is reported for a plurality of instructions to be processed in parallel by the exception reporting unit, and a reexecution unit for restoring, in response to the interrupt request, the pipeline processing by the instruction control unit to the state before execution of the leading one of the plurality of instructions to be processed in parallel in which the exception has been detected, and reexecuting the plurality of instructions one by one from the leading instruction thereof through the instruction control unit.

In an example of the invention, assume that some exception has occurred in any one of a plurality of instructions to be processed in parallel. The pipeline processing is restored to the state before execution of the leading one of the plurality of instructions including the instruction in which the exception has occurred. After that, the pipeline processing of the plurality of instructions for which the exception has been detected is restarted one by one from the leading one thereof. In this way, an instruction that has developed the exception can be specified and accurate interruption can be conducted.

In an example of the invention, as described above, an exception is detected and reported collectively to an interrupt request control unit for a plurality of instructions to be processed in parallel. In the case where an exception occurs, the instruction control unit and the interrupt request issuing unit are controlled to generate an interrupt with the plurality of the instructions including the instruction that has developed the exception thereby to suppress the execution of or execute the instructions. After that, the plurality of instructions for which the exception has been detected are executed one by one from the leading instruction thereof. In this way, the instruction that has developed an exception is specified to assure an accurate interruption. Consequently, the configuration is simplified as the need is eliminated of a circuit for reporting the detection of an exception for each set of concurrently-processed instructions, a circuit for holding the interrupt information and a circuit for suppressing the execution of or executing each instruction.

In view of the low frequency of exception occurrence, the temporally critical processing is not required for the resulting interrupt. Therefore, no special problem is posed by restoring the the processing to the state before execution of the leading one of a plurality of the instructions after detection of an exception and restarting the pipeline processing for each instruction from the leading one of the instructions.

BRIEF DESCRIPTION OF THE DRAWINGS

FIG. 7 is a time chart showing an example of the interrupt processing performed when an exception of completion type occurs according to this embodiment.

DESCRIPTION OF THE PREFERRED EMBODIMENTS

Figure 1:
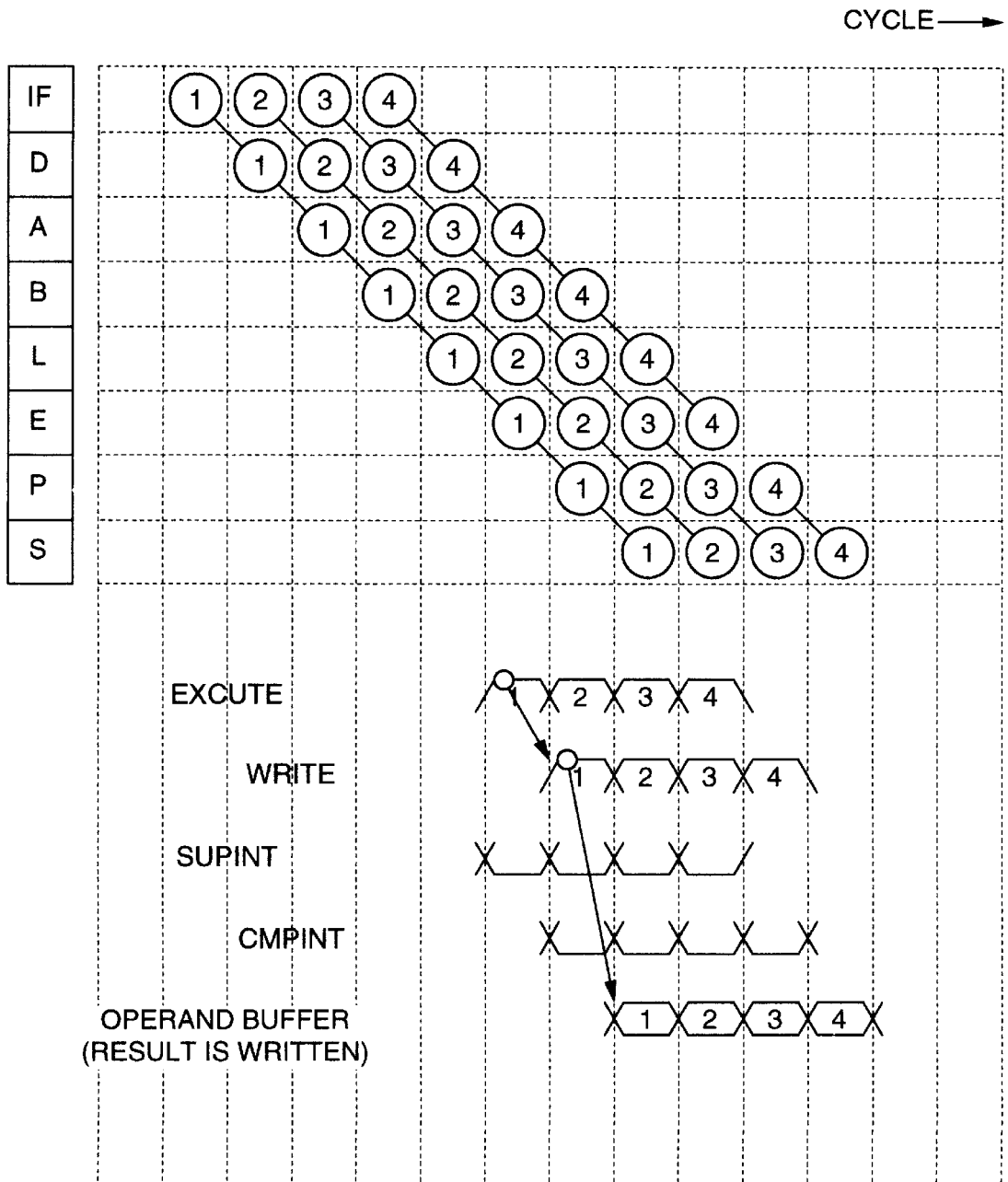
FIG. 1 is a time chart showing the process for normal execution of the conventional pipeline processing.
Figure 2:
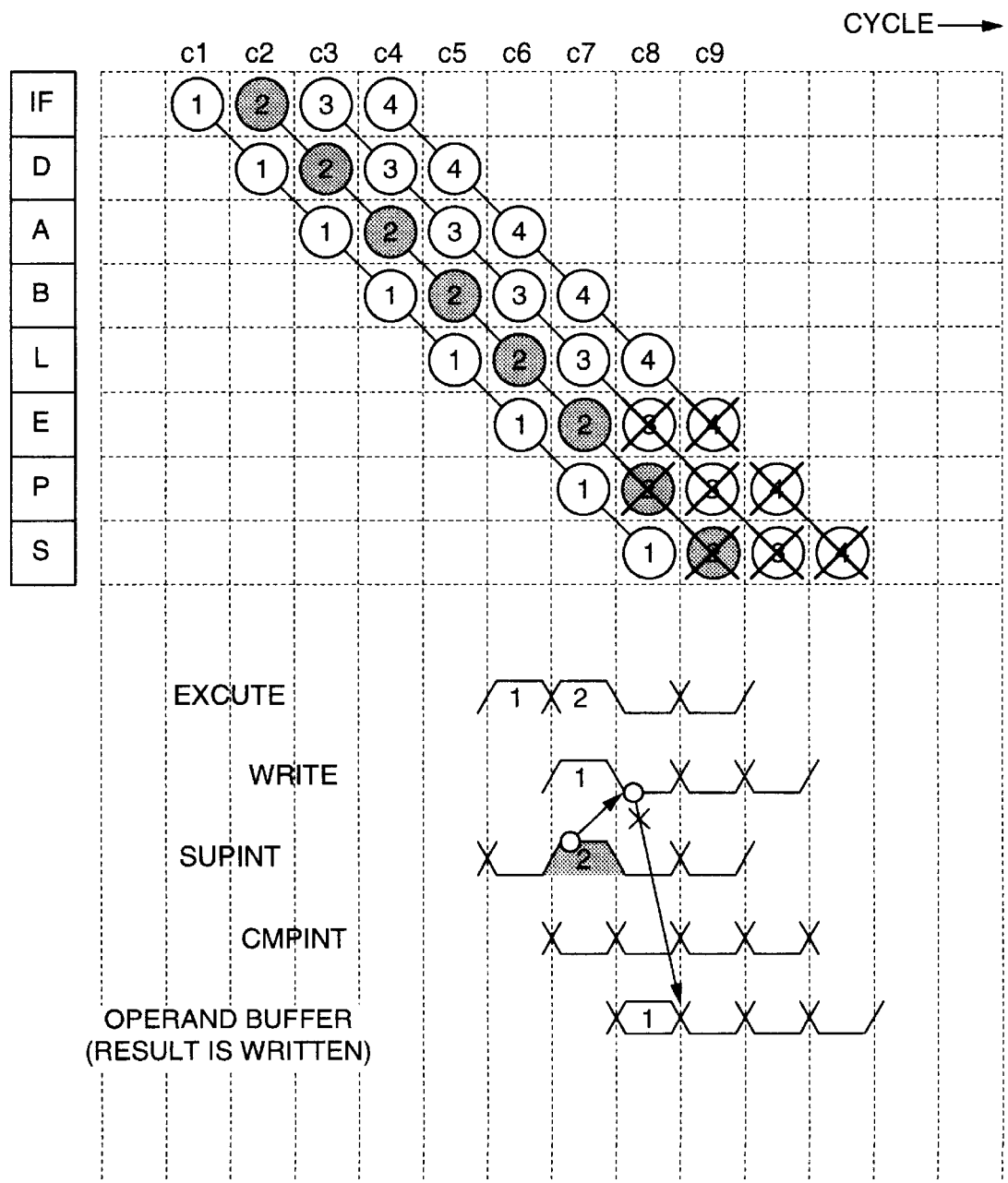
FIG. 2 is a time chart showing the process performed upon occurrence of an interrupt of cancellation or suppression type in the conventional pipeline processing.
Figure 3:
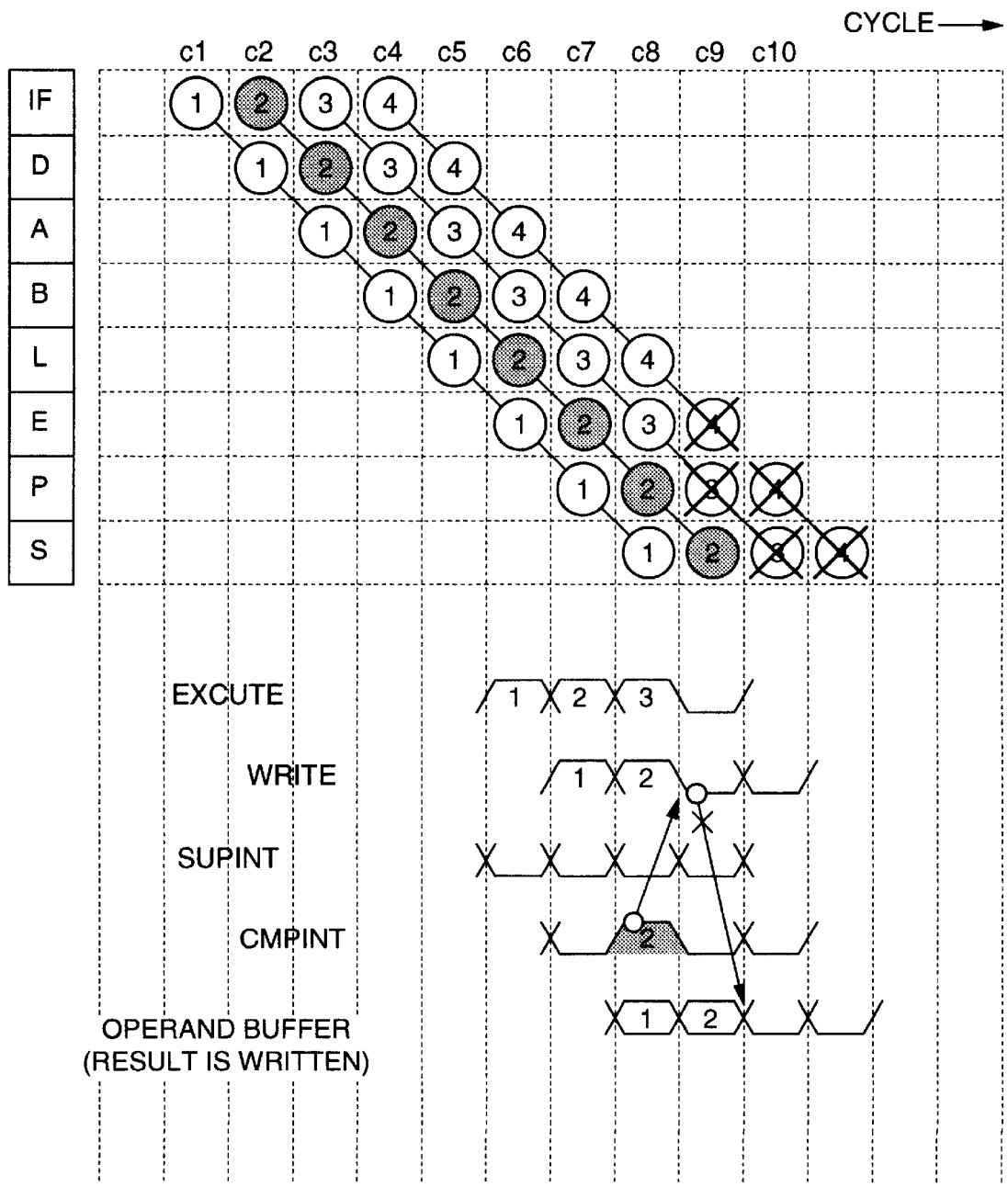
FIG. 3 is a time chart showing the process performed in the case where an interrupt of completion type occurs in the conventional pipeline processing.
Figure 4:
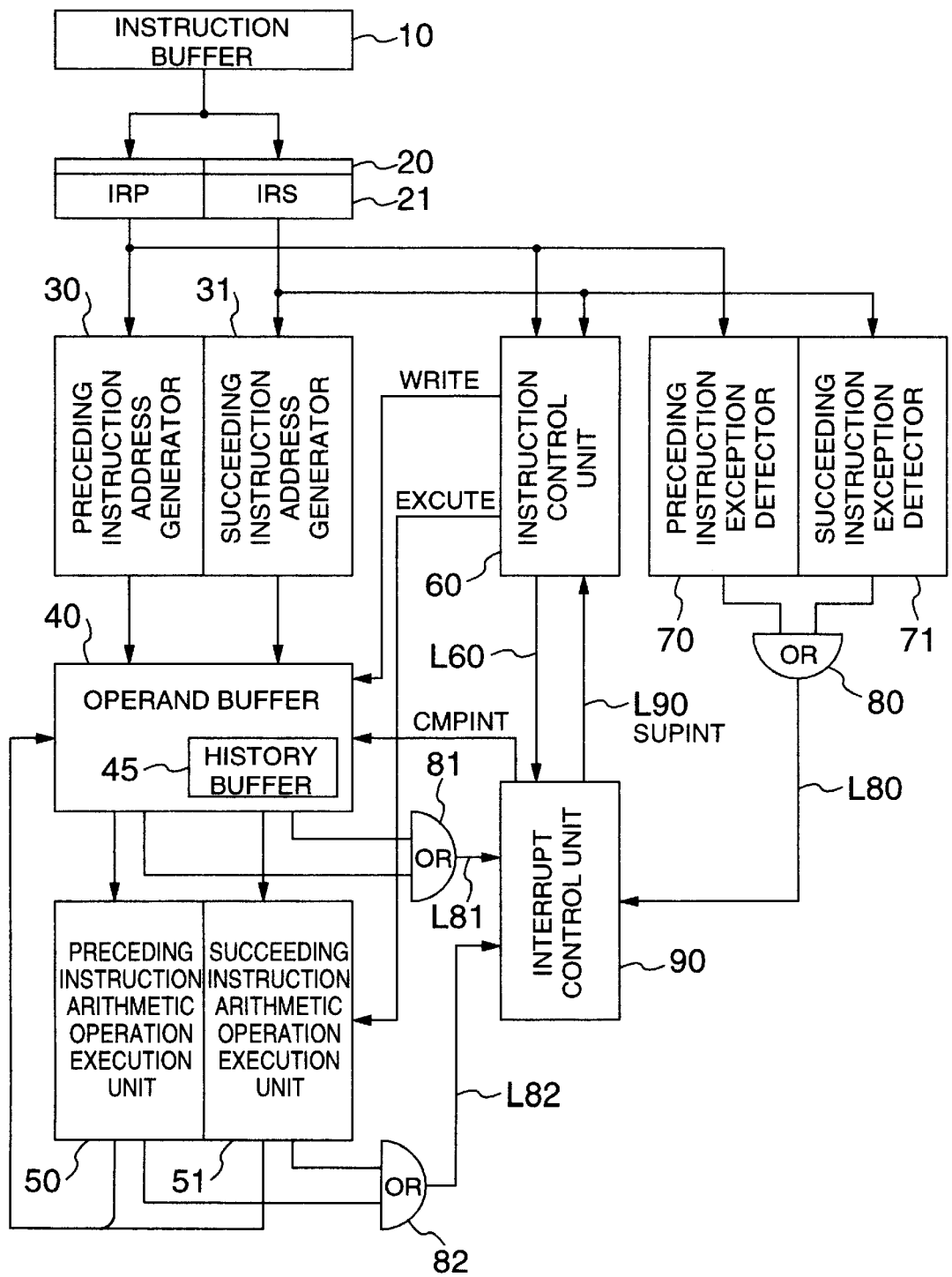
FIG. 4 is a block diagram showing a configuration of an information processing system according to an embodiment of the invention.

An information processing system having an interrupt processing function according to an embodiment of the present invention will be described in detail with reference to the accompanying drawings. FIG. 4 is a block diagram showing a configuration of an information processing system having the interrupt processing function according to an embodiment of the invention. The information processing system having the interrupt processing function according to this embodiment is adapted to process in pipeline a plurality of instructions, or two instructions including leading (preceding) and succeeding ones in the case under consideration, for example, at the same time or in parallel, thereby increasing the processing speed and realizing an accurate interruption as in the prior art.

In FIG. 4, reference numeral 10 designates an instruction buffer permitting high-speed access of an instruction, numerals 20, 21 instruction registers (IRP, IRS) for holding the preceding and succeeding instructions, respectively, read out of the instruction buffer 10, and numerals 30, 31 address generating circuits for generating an operand address of the preceding and succeeding instructions held in the IRP 20 and IRS 21, respectively. Numeral 40 designates an operand buffer for holding the memory data or the register data for operands, supplying an arithmetic operand to arithmetic operation execution sections 50, 51, respectively, for the preceding and succeeding instructions in accordance with the instructions of the address generating circuits 30, 31, detecting an exception (an access exception such as a page fault) of the operand, and storing the result of the arithmetic operation of the arithmetic operation execution section. Numerals 50, 51 designate arithmetic operation execution sections for executing the arithmetic operation as designated by each of the preceding and succeeding instructions, respectively, and detecting the arithmetic operation exception (e.g. overflow of fixed point). Numeral 60 designates an instruction control unit for controlling the instructions of the information processing system and the execution thereof other than interrupts, including the two-instruction processing in which the two preceding (leading) and succeeding instructions are processed at the same time (concurrently) or in parallel and the one-instruction processing in which two instructions are processed individually. Numerals 70, 71 designate instruction exception detection circuits for detecting an exception of an instruction such as an invalid instruction code exception-based on the instructions held in the IRP 20, IRS 21. Numerals 80, 81, 82 designate OR circuits for unifying the exception information detected for each of the preceding and succeeding instructions at the instruction exception detection circuits 70, 71, the operand buffer 40 and the arithmetic operation execution sections 50, 51. Numeral 90 designates an interrupt control circuit (interrupt control unit) for controlling the interrupt processing in accordance with the exception information sent out from the OR circuits 80, 81, 82 through lines L80, L81, L82, respectively, and the two-instruction processing mode or the one-instruction processing mode notified from the instruction control unit 60 through the line L60.

As described above, the instruction exception detection circuits 70, 71 constitute an exception occurrence detection unit. Also, the operand buffer 40 and the arithmetic operation execution sections 50, 51 each has the function of an exception occurrence detection unit. Further, the OR circuits 80, 81, 82 each makes up a unit for unifying and reporting the data according to each cause of an exception.

A plurality of successive instructions in a main memory (not shown) are read out and stored in advance in the instruction buffer 10. Normally, in the two-instruction processing mode, as shown in the timing charts of FIGS. 6 and 7 described later, the two preceding and succeeding instructions are processed concurrently or in parallel in each cycle pitch under the control of the instruction control unit 60, as described below. In the first cycle, the two preceding and succeeding instructions are read out at the same time to instruction registers IRP 20, IRS 21, respectively, from the instruction buffer 10 (IF stage). In the next cycle, the instructions are decoded in the instruction registers IRP 20, IRS 21, respectively (D stage). On the basis of the instructions decoded in the instruction registers IRP 20, IRS 21, respectively, in the next cycle, operand addresses are generated in address generating circuits 30, 31, respectively, and transferred to an operand buffer (A stage). In the next cycle, the operand data are read out of the operand buffer 40 and applied to the arithmetic operation execution sections 50, 51 (B stage). In the next cycle, the arithmetic operation of these operand data is executed at the arithmetic operation execution sections 50, 51, respectively, in accordance with an execution permit signal EXECUTE from the instruction control unit 60 (E stage). In the next cycle, the result of the arithmetic operation at the arithmetic operation execution sections 50, 51 is transferred to the operand buffer 40 (P stage), followed by the next cycle in which the result of the arithmetic operation in the arithmetic operation execution sections 50, 51 is stored in the operand buffer 40 in accordance with a write permit signal WRITE from the instruction control unit 60 (S stage). The aforementioned stages are sequentially repeated for each preceding and succeeding two instructions thereby to perform the concurrent pipeline processing of each two preceding and succeeding instructions.

In the decode stage D of the pipeline processing, the instruction exception detection circuits 70, 71 check for occurrence of an exception such as an invalid instruction code exception for each two preceding and succeeding instructions decoded by the instruction registers IRP 20, IRS 21, respectively. Upon detection of an exception, the information indicating the detected exception is outputted through an OR circuit 80 and the line L80 to the interrupt control unit 90. In similar fashion, in the operand data read stage B, the operand buffer 40 checks for occurrence of an access exception of a memory such as a page fault each time the operand data corresponding to the two preceding and succeeding instructions is read. Upon detection of an exception, the information indicating the detected exception is applied through an OR circuit 81 and the line L81 to the interrupt control unit 90. In similar manner, in the arithmetic operation execution stage E, the arithmetic operation execution sections 50, 51 check for the occurrence of an arithmetic operation exception such as an overflow of a fixed point each time the arithmetic operation is executed, based on the operand data corresponding to the two preceding and succeeding instructions, and upon detection of an exception, the information indicating the detected exception is outputted to the interrupt control unit 90 through an OR circuit 82 and the line L82. In this way, the exceptions such as an invalid instruction code exception detected by the exception detection circuits 70, 71 are unified by the OR circuit 80 and reported to the interrupt control unit 90 through the line L80, the exceptions such as an access exception detected by the operand buffer 40 are unified by the OR circuit 81 and reported to the interrupt control unit 90 through the line L81, and the exceptions such as an arithmetic operation exception detected by the arithmetic operation execution sections 50, 51 are unified by the OR circuit 82 and reported to the interrupt control unit 90 through the line L82. As described above, according to this embodiment, the exceptions such as the invalid code exception, the access exception and the arithmetic operation exception are each unified according to the cause thereof and reported to the control unit 90 separately through the OR circuits 80 to 82.

Figure 5:
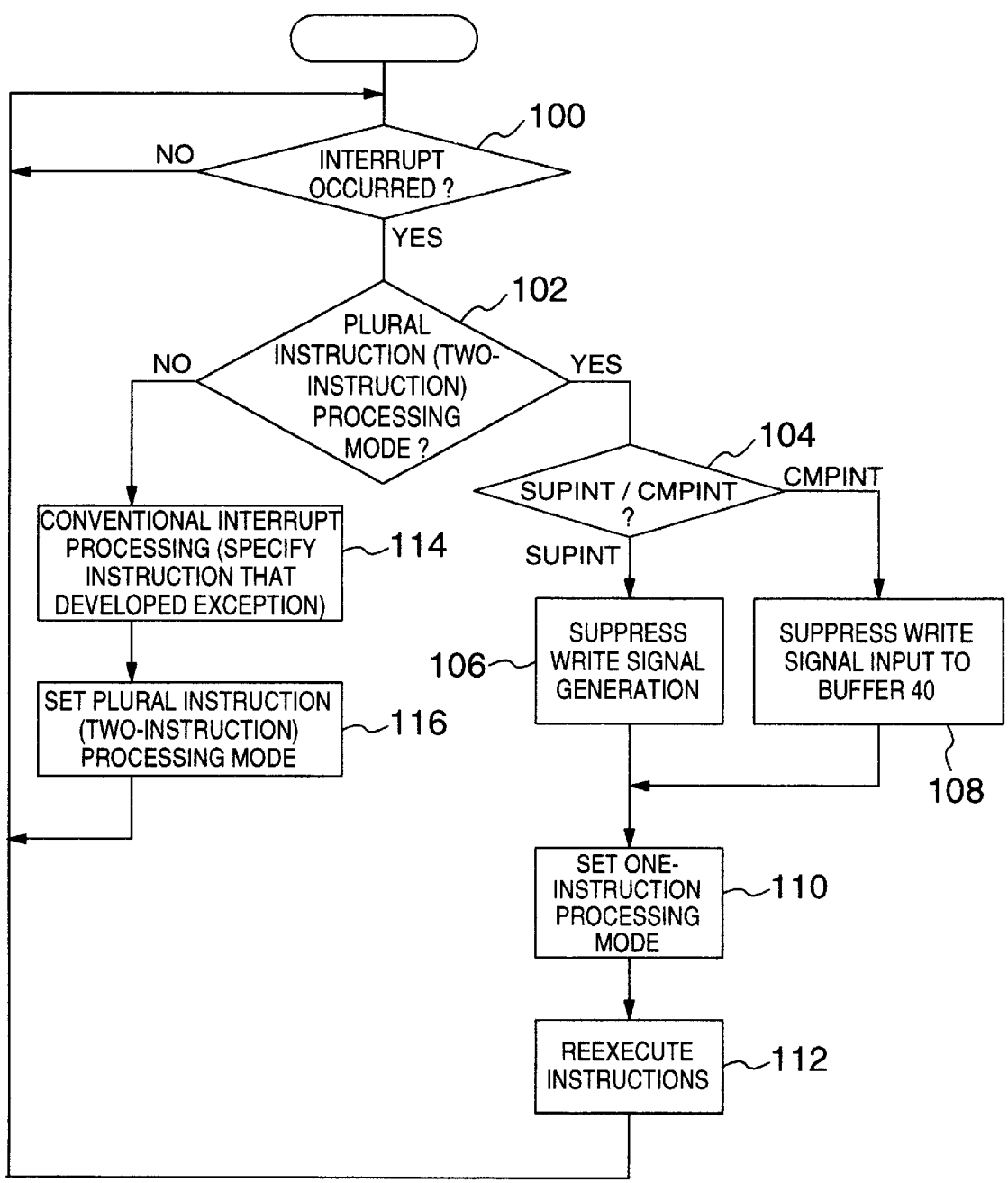
FIG. 5 is a flowchart showing the interrupt processing performed by an interrupt control unit and an instruction control unit of FIG. 4 upon occurrence of an exception.
Figure 6:
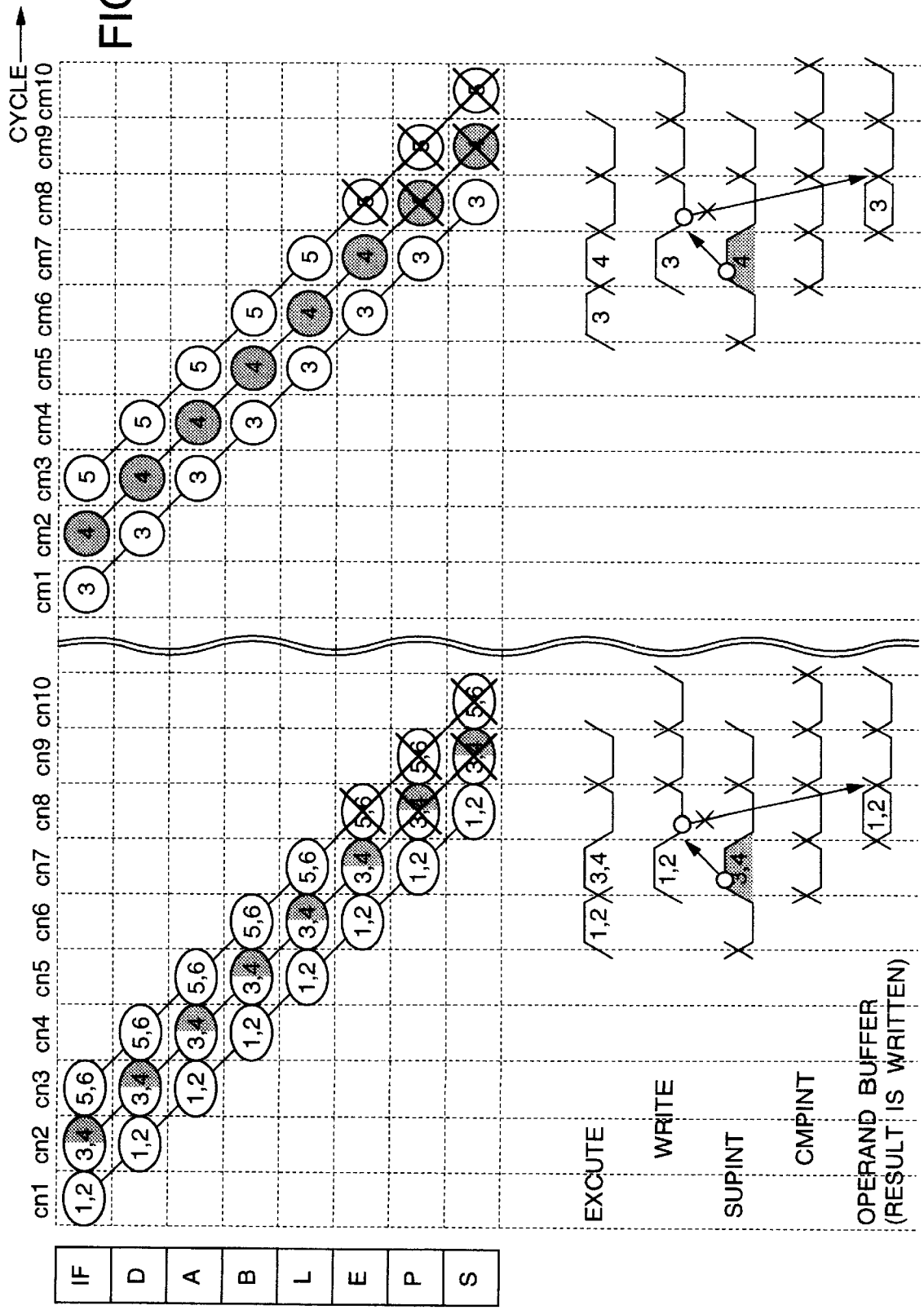
FIG. 6 is a time chart showing an example of the interrupt processing performed when an exception of cancellation type or suppression type occurs according to this embodiment.

Now, the processing performed when an exception occurs will be explained with reference to FIGS. 4 to 7. FIG. 5 is a flowchart showing the processing performed by the interrupt control unit 90 and the instruction control unit 60 upon occurrence of an exception. FIG. 6 is a time chart showing an example of the interrupt processing of suppression type upon occurrence of an exception of cancellation or suppression type. FIG. 7 is a time chart showing an example of the interrupt processing of completion type upon occurrence of an exception of completion type. The processing of FIG. 5 can alternatively be executed by a microprogram in the control units 60, 90, for example.

In FIG. 5, first, the interrupt control unit 90, upon application thereto of the information indicating the occurrence of an exception through any one of the OR circuits 80 to 82 (step 100), decides whether the instruction processing mode is a plural instruction (two instructions in this embodiment) processing mode or a one instruction processing mode (step 102). The information as to whether the processing mode is the two-instruction processing mode or the one-instruction processing mode is applied by the instruction control unit 60 through the line L60 to the interrupt control unit 90. In the two-instruction processing mode, the interrupt control unit 90 decides whether the exception is of suppression type or completion type based on the information indicating the occurrence of an exception applied thereto. If the exception is of suppression type, a signal SUPINT indicating the same is applied to the instruction control unit 60, while if the exception is of completion type, a signal CMPINT indicating the same is applied to the instruction control unit 60.

First, an explanation will be given of the case where the exception is of suppression type with reference to the example shown in FIG. 6. In the example of FIG. 6, the occurrence of an exception of suppression type is detected in the instruction ③ or ④, or in the instruction ④ in this case, in cycle cn7. The instruction control unit 60, upon receipt from the interrupt control unit 90 of a signal SUPINT indicating the occurrence of an exception of suppression type in any one of instructions ③ and ④, suppresses the generation and application of the write permit signal WRITE for the instructions ④ and ③ from the instruction control unit 60 to the buffer 40 in cycle cn8 (step 106). As a result, the result of execution of the instructions ③ and ④ is not stored in the buffer 40. After that, the interrupt control unit 90 instructs the instruction control unit 60 to set the instruction processing mode to the one-instruction processing mode, so that the instruction control unit 60 sets the instruction processing mode to the one-instruction processing mode (step 110). Further, the interrupt control unit 90 issues to the instruction control unit 60 an interrupt request to restart processing the instructions one by one from the preceding instruction ③ including and subsequent to instructions ③, ④ of which the execution has been blocked. Consequently, the instruction control unit 60 restores the pipeline processing to the state before execution of the preceding instruction ③ of the preceding and succeeding instructions ③, ④. After that, under the control of the instruction control unit 60, the pipeline processing is restarted from the preceding instruction ③ at the rate of one instruction in one cycle pitch (step 112). In this pipeline processing (cycle cm1 and so forth in FIG. 6), the interrupt control unit 90 decides whether an exception has occurred or not (step 100), and then decides whether the instruction processing mode is the plural instruction (two instructions in this embodiment) processing mode or the one-instruction processing mode (step 102). Since the mode is the one-instruction processing mode, the process proceeds to step 114. The interrupt control unit 90 specifies an instruction that has developed an exception, i.e. in the case of FIG. 6, detects that an exception of suppression type has occurred in the instruction ④ from the exception information input thereto through an OR circuit, and issues an interrupt request to the instruction control unit 60. As a result, the instruction control unit 60, upon receipt of the signal SUPINT indicating the occurrence of an exception of suppression type in the instruction ④ from the interrupt control unit 90, suppresses the generation of the write permit signal WRITE for the instruction ④ in cycle cm8 in response to the same signal (step 114).

As described above, the write operation into the buffer 40 is prevented for the preceding instruction ③ as well as for the instruction ④ which has developed an exception of suppression type. Then, the instructions are processed again one by one from the preceding instruction ③, and after completion execution of the instruction ③, a correct interrupt is realized for the exception instruction ④. The processing in step 114, i.e. the detection of an exception and the occurrence of an interrupt in the one-instruction processing mode is similar to the conventional one, so that an accurate interrupt is realized as in the prior art.

After that, the instruction control unit 60 restores the setting from the one-instruction processing mode to the two-instruction processing mode (step 116). An arrangement can be made in which the write permit signal WRITE is generated from the interrupt control unit 90, and in steps 106, 114, the write permit signal WRITE is suppressed from being applied from the interrupt control unit 90 to the buffer 40.

Now, an exception of completion type will be explained with reference to the case of FIG. 7 as an example. In the example shown in FIG. 7, the occurrence of an exception of completion type is detected in the instruction ③ or ④, or in the instruction ④ in this case, in cycle cn8. Upon occurrence of an exception of completion type, the interrupt control unit 90 cannot notifies the generation of such an exception to the instruction control unit 60 before the instruction control unit 60 can suppress the generation of the write permit signal WRITE. In view of this, the interrupt control unit 90 applies the signal CMPINT indicating the occurrence of an exception of completion type to the buffer 40, and thus prevents the write permit signal WRITE for the instructions ④ and ③ from the instruction control unit 60 from being applied to the buffer 40 in cycle cn9 (step 108). The subsequent steps 110, 112, 100 and 102 are similar to the corresponding ones described above.

In step 114, the interrupt control unit 90, whenever it specifies the instruction that has developed an exception from the exception information applied thereto through an OR circuit, i.e. whenever it detects the occurrence of an exception of completion type in the instruction ④ in the example of FIG. 7, issues an interrupt request to the instruction control unit 60. Thus, the instruction control unit 60, upon receipt of the signal CMPINT indicating the occurrence of an exception of completion type in the instruction ④ from the interrupt control unit 60, suppresses the generation of the write permit signal WRITE for the instruction ⑤ in cycle cm9 in response to the signal.

As described above, the write operation to the buffer 40 is prevented for the preceding instruction ③ as well as for the instruction ④ that has developed an exception of completion type. After that, the processing of the instructions is restarted one by one from the preceding instruction ③. In this way, after completion execution of the instruction ③, a correct interruption is realized in the exception instruction ④. The processing of step 114, i.e. the processing in the case of exception detection or occurrence of an interrupt in the one-instruction processing mode is similar to the corresponding processing in the prior art, and can realize as accurate an interrupt as in the prior art.

In the case where the execution of the two preceding and succeeding instructions (the storage of the result of the arithmetic operation in the buffer 40) cannot be suppressed in the example described above, the following processing can alternatively be performed. The result of the arithmetic operation is permitted to be stored in the operand buffer 40 for the two preceding and succeeding instructions that have developed an exception, and the value of the operand buffer 40 is saved beforehand in a history buffer 45 (incorporated in the operand buffer 40 in the example of FIG. 4) before being updated, i.e. before storing the arithmetic operation result therein. Thus, in executing step 114, the value saved in the history buffer 45 is written back to the operand buffer 40, so that the value of the operand buffer 40 is restored to the state before execution of the leading one of the preceding and succeeding instructions.

The embodiments are described above with reference to the case in which two instructions are subjected to pipeline processing concurrently. The invention, however, is applicable with equal effect to the case in which three or more instructions are processed in pipeline concurrently. In such a case, the configuration of FIG. 4 is modified in such a manner that the instruction registers, address generating circuits, exception detection circuits and the arithmetic operation execution circuits are provided in the same number as the instructions processed in pipeline concurrently. Nevertheless, the OR circuits 80, 81, 82 each remain one in number. The OR circuit 80 ORs the exception information from a plurality of exception detection circuits and outputs the result. The OR circuit 81 ORs a plurality of the exception information from the operand buffer 40 and outputs the result. Also, the OR circuit 82 ORs the exception information from a plurality of arithmetic operation execution sections and outputs the result.

According to the embodiment shown in FIG. 4, assume that some exception occurs during the concurrent execution of the two preceding and succeeding instructions. The pipeline processing is restored to the state before execution of the leading one of the two instructions, after which the two instructions restart to be processed in pipeline one by one from the leading one of them and an exception generation instruction is specified. In this way, accurate interrupt is assured. This is of course also the case with which three or more instructions are executed concurrently.

It will thus be understood from the foregoing description that in an information processing system of pipeline type according to this invention for processing a plurality of instructions concurrently, an accurate interrupt can be realized like in the conventional systems without any complicated circuits even in the case where an exception occurs in the concurrent processing of a plurality of instructions.

What is claimed is:

1. An interrupt processing system for an information processing system of pipeline control type capable of sequentially processing a plurality of instructions in parallel through an instruction control unit, comprising:

an exception occurrence detection unit for detecting occurrence of an exception for each plurality of instructions to be processed in parallel;

an exception reporting unit for reporting the occurrence of an exception for said plurality of instructions to be processed in parallel as to which occurrence of an exception has been detected collectively according to each cause of the exception;

an interrupt request control unit for issuing an interrupt request in a case where the occurrence of an exception is reported for said plurality of instructions to be processed in parallel from said exception reporting unit; and a reexecution unit for restoring, in response to said interrupt request, the pipeline processing of said instruction control unit to a state before execution of the leading one of said plurality of instructions to be processed in parallel for which said exception is detected and for reexecuting the plurality of instructions to be processed in parallel as to which occurrence of an exception has been detected one by one sequentially from leading one thereof through said instruction control unit.

2. An interrupt processing system according to claim 1, wherein said exception occurrence detection unit includes a first exception occurrence detection section for detecting occurrence of one of exceptions of cancellation type and suppression type for each plurality of instructions to be processed in parallel, and a second exception occurrence detection section for detecting occurrence of an exception of completion type for each plurality of instructions to be processed in parallel; and wherein said exception reporting unit includes a first exception reporting section for reporting occurrence of one of the exceptions of cancellation type and suppression type in a case where occurrence of an exception is detected by said first exception occurrence detection section and a second exception reporting section for reporting occurrence of an exception of completion type in a case where occurrence of an exception is detected by said second exception occurrence detection section.

3. An interrupt processing system according to claim 1, wherein said exception occurrence detection unit includes a first exception occurrence detection section for detecting occurrence of an exception such as an invalid instruction code for each plurality of instructions to be processed in parallel, a second exception occurrence detection section for detecting occurrence of an access exception for each plurality of instructions to be processed in parallel, and a third exception occurrence detection section for detecting occurrence of an arithmetic operation exception for each plurality of instructions to be processed in parallel; and wherein said exception reporting unit includes a first exception reporting section for reporting occurrence of an exception such as an invalid instruction code exception in a case where occurrence of an exception is detected by said first exception occurrence detection section, a second exception reporting section for reporting occurrence of an access exception in a case where occurrence of an exception is detected by said second exception occurrence detection section, and a third exception reporting section for reporting occurrence of an arithmetic operation exception in a case where occurrence of an exception is detected by said second exception occurrence detection section.

4. An interrupt processing system according to claim 1, wherein said reexecution unit detects an instruction that has developed an exception by reexecuting said plurality of instructions to be processed in parallel as to which occurrence of an exception has been detected one by one sequentially from the leading one thereof and issues an interrupt request.

5. An information processing system of pipeline control type capable of processing a plurality of instructions in parallel, comprising:

an instruction control unit for sequentially processing a plurality of instructions in parallel in accordance with a pipeline control scheme;

an exception occurrence detection unit for detecting occurrence of an exception for each plurality of instructions to be processed in parallel;

an exception reporting unit for reporting occurrences of exceptions for a plurality of instructions to be processed in parallel as to which occurrence of an exception has been detected collectively according to each cause of said exceptions;

an interrupt request control unit for issuing an interrupt request in a case where occurrence of an exception is reported in a plurality of instructions to be processed in parallel by said exception reporting unit; and a reexecution unit for restoring, in response to said interrupt request, the pipeline processing of said instruction control unit to a state before execution of leading one of said plurality of instructions to be processed in parallel for which said exception is detected and for reexecuting the plurality of instructions to be processed in parallel as to which occurrence of an exception has been detected, one by one sequentially from leading one thereof through said instruction control unit.

6. An information processing system of pipeline control type capable of processing a plurality of instructions sequentially and in parallel, comprising:

an instruction buffer for storing a succession of instructions read from a main memory;

a plurality of instruction registers for decoding a plurality of instructions sequentially read from said instruction buffer;

an operand buffer;

a plurality of address generating circuits for generating operand addresses on a basis of said plurality of instructions decoded from said plurality of instruction registers, and for transferring the operand addresses to said operand buffer;

a plurality of arithmetic operation execution sections for arithmetically operating operand data corresponding to said plurality of instructions read from said operand buffer and storing result of the arithmetic operation in said operand buffer;

a plurality of exception detection circuits each for detecting occurrence of an exception for each plurality of said instructions decoded by said plurality of instruction registers;

a first OR circuit for producing a logical sum of information indicating occurrence of an exception detected by said plurality of exception detection circuits;

a second OR circuit for producing a logical sum of information indicating occurrence of an exception detected by said operand buffer;

a third OR circuit for producing a logical sum of information indicating occurrence of an exception detected by said plurality of arithmetic operation execution sections;

an interrupt control unit for issuing an interrupt request in response to the information indicating the occurrence of an exception from said first, second and third OR circuits; and an instruction control unit for sequentially processing a plurality of instructions in pipeline in parallel by controlling said instruction buffer, said plurality of instruction registers, said plurality of address generating circuits, said operand buffer and said plurality of arithmetic operation execution sections, wherein said instruction control unit restores, in response to said interrupt request, the pipeline processing to a state before execution of leading one of said plurality of instructions to be processed in parallel for which the occurrence of an exception has been detected and reexecutes said plurality of instructions to be processed in parallel as to which occurrence of an exception has been detected, one by one sequentially from leading one thereof.

7. In an information processing system of pipeline control type capable of sequentially processing a plurality of instructions in parallel, an interrupt processing method for sequentially performing the following steps for each plurality of instructions, said steps including:

(a) detecting occurrence of an exception for each plurality of instructions to be processed in parallel;

(b) reporting occurrences of exceptions detected for said plurality of instructions collectively according to each cause of exception;

(c) issuing an interrupt request in a case where occurrence of an exception is reported for said plurality of instructions to be processed in parallel from said step (b); and (d) restoring, in response to said interrupt request, the pipeline processing to a state before execution of the leading one of said plurality of instructions for which said exception is detected, and reexecuting the plurality of instructions for which said exception is detected one by one sequentially from said leading instruction thereof.

8. An interrupt processing method according to claim 7, wherein said step (a) includes a substep (a-1) of detecting occurrence of an exception of one of cancellation type and suppression type for each said plurality of instructions to be processed in parallel and a substep (a-2) for detecting occurrence of an exception of completion type for each said plurality of instructions to be processed in parallel; and wherein said step (b) includes a substep (b-1) for reporting occurrence of an exception of one of cancellation type and suppression type in a case where the occurrence of an exception is detected in said substep (a-1) and a substep (b-2) for reporting occurrence of an exception of completion type in a case where the occurrence of an exception is detected in said substep (a-2).

9. An interrupt processing method according to claim 7, wherein said step (a) includes a substep (a-1) for detecting occurrence of an exception such as an invalid code exception for each said plurality of instructions to be processed in parallel, a substep (a-2) for detecting occurrence of an access exception for each said plurality of instructions to be processed in parallel, and a substep (a-3) for detecting occurrence of an arithmetic operation exception for each said plurality of instructions to be processed in parallel;

wherein said step (b) includes a substep (b-1) for reporting the occurrence of an exception such as an invalid instruction code exception in a case where the occurrence of an exception is detected in said substep (a-1), a substep (b-2) for reporting the occurrence of an access exception in a case where the occurrence of an exception is detected in said substep (a-2), and a substep (b-3) for reporting the occurrence of an arithmetic operation exception in a case where the occurrence of an exception is detected in said substep (a-3).

10. An interrupt processing method according to claim 7, wherein said step (d) detects an instruction that has developed an exception and issues an interrupt request by reexecuting said plurality of instructions for which said exception has been detected one by one sequentially from the leading one thereof.

* * * * *